United States Patent

[11] 3,551,680

| [72] | Inventor | Sheldon A. Knight<br>Mountain View, Calif. |
|------|----------|------------------------------|
| [21] | Appl. No. | 412,907 |
| [22] | Filed | Nov. 23, 1964 |
| [45] | Patented | Dec. 29, 1970 |
| [73] | Assignee | American Standard Inc.<br>a corporation of Delaware |

[54] STAR FIELD OBSERVATION APPARATUS HAVING RETICLE WITH EXPONENTIALLY VARYING OPTICAL TRANSMITTIVITY AND MIRROR SWEEPING THE STAR FIELD ACROSS THE MIRROR AT EXPONENTIALLY VARYING VELOCITY
12 Claims, 5 Drawing Figs.

| [52] | U.S. Cl. | 250/203, 250/236, 250/233 |
|------|----------|---------------------------|
| [51] | Int. Cl. | G01j 1/20 |
| [50] | Field of Search | 250/203, 233, 237; 88/1HVS, 1Q |

[56] References Cited
UNITED STATES PATENTS

| 2,931,912 | 2/1960 | Macleish | 250/203 |
| 2,942,118 | 6/1960 | Gedance | 250/203 |
| 2,967,247 | 1/1961 | Turck | 250/203 |
| 3,134,022 | 5/1964 | Jones et al. | 250/233 |

*Primary Examiner*—Ralph G. Nilson
*Assistant Examiner*—Martin Abramson
*Attorney*—Flehr, Hohbach, Test, Albritton & Herbert ABSTRACT: An apparatus for generating signals having frequency components corresponding to the position of discrete data comprising a transducer for receiving data images and generating a representative signal, means for projecting an image of each discrete data onto said transducer, a mask disposed to intercept said images, and means providing rectilinear relative movement between said images and said mask, said mask having an optical transmission which repeatedly varies in the direction of said relative movement whereby to modulate the intensity of each image so that a signal component is generated by the transducer corresponding thereto.

PATENTED DEC 29 1970　　　　　　　　　　　3,551,680

INVENTOR.
SHELDON A. KNIGHT

BY

ATTORNEYS

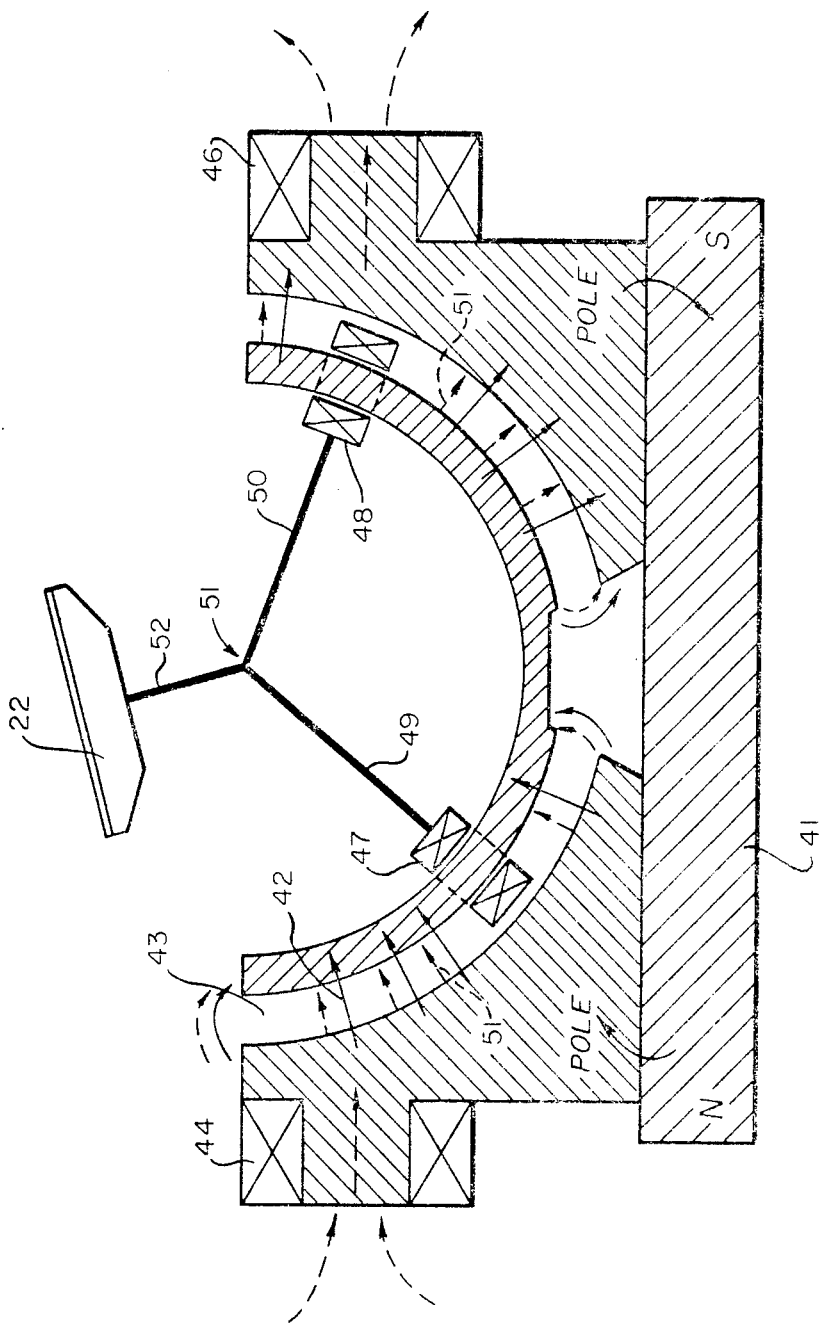

STAR FIELD OBSERVATION APPARATUS HAVING RETICLE WITH EXPONENTIALLY VARYING OPTICAL TRANSMITTIVITY AND MIRROR SWEEPING THE STAR FIELD ACROSS THE MIRROR AT EXPONENTIALLY VARYING VELOCITY

This invention relates generally to a signal generating system and method and more particularly to a system for generating a signal having frequency components each corresponding to position of objects, marks or other intelligence which can be imaged through a mask onto a transducer.

In many scientific and military space missions, it is required to have precise knowledge of the vehicle attitude for proper interpretation of the outcome of the experiments. In many of these missions, the vehicle attitude need not be accurately controlled; rather, it must only be precisely measured at the time the experiment is performed. When the requirement for attitude measurement rather than control exists, there is no need for complete attitude computation on board the vehicle. Raw data from which attitude can be computed can be generated on board, and these data can then be transmitted to a ground station along with the other data.

One reference for determining space vehicle position and attitude is to observe the star field and transmit data corresponding thereto.

Data can be stored in the form of marks or the like on photographic film, cards or the like. The data or information can be stored in the form of position or density, or both. In control of machine tools and the like, surfaces may be observed to provide discrete signals for control.

In facsimile reproduction and transmission, a single signal representative of many discrete areas may be employed for carrying the information.

It is an object of the present invention to provide a system capable of generating a signal having a plurality of frequency components, each corresponding to location and intensity of an object such as a star, marks such as dots, spots or the like, or other intelligence which may be imaged through a mask onto a transducer.

It is a further object of the present invention to provide a system for generating a signal including intelligence as to location of one or more objects in at least one direction.

It is another object of the present invention to provide a signal generating system for generating signals containing intelligence as to location of one or more objects in two directions.

It is another object of the present invention to provide a system of the foregoing character suitable for observing an arbitrary star field and generating a signal containing frequency components corresponding to the location and intensity of stars in said field.

It is another object of the present invention to provide a data reduction system for reducing data of the aforementioned type.

It is still a further object of the present invention to provide a signal generating system which is extremely simple in design, light weight and inexpensive.

The foregoing and other objects of the invention will become more clearly apparent from the following description taken in conjunction with the attached drawings.

Referring to the drawings:

FIG. 4 is a schematic diagram of the image scanning mechanism employed in the apparatus of FIGS. 2 and 3.

Generally, the intensity of the images of various objects in the field of view of the apparatus is modulated by a coding mask. The modulated images are collected by a phototransducer which generates an electrical signal. The signal is amplified and telemetered or otherwise transmitted to a data reduction system where information corresponding to the original intelligence is recovered.

The preferred embodiment of the invention will be described. This is the system employed for identifying arbitrary star fields to give the precise attitude of a space vehicle.

The images are the light from the various stars. These images are modulated by the coding mask and directed onto a phototransducer or detector. The transducer generates a signal having frequency components with the frequency corresponding to location and amplitude corresponding to brightness.

Figure 1:
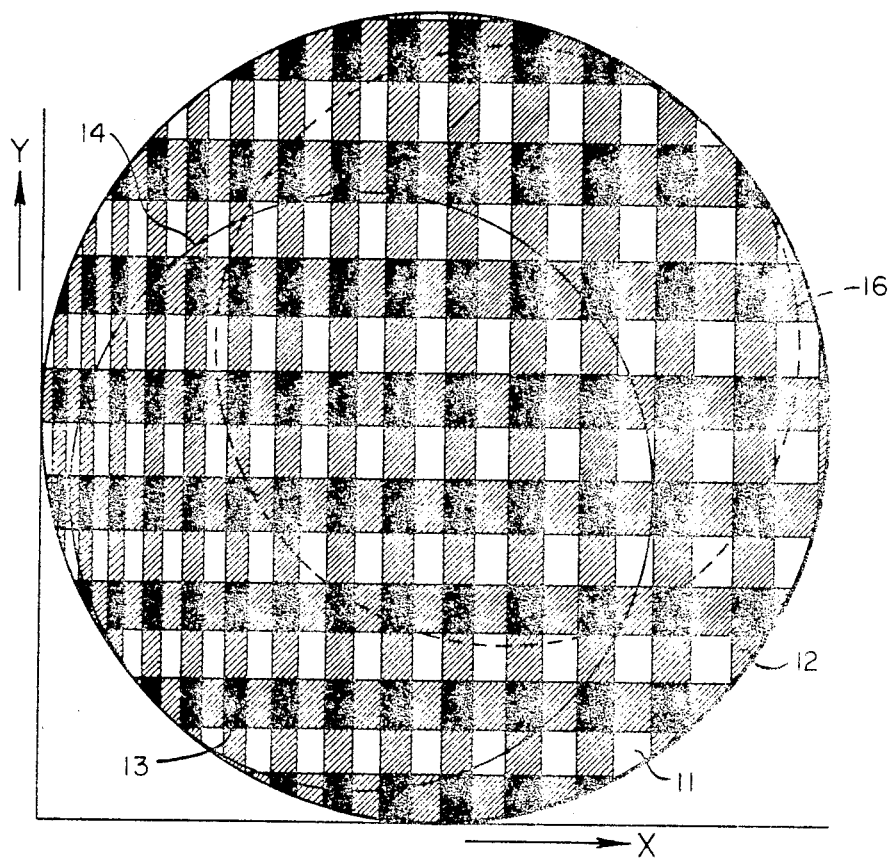
FIG. 1 is a view showing a typical coding mask for use in the system of the present invention.

A typical coding mask for use in a system is shown in FIG. 1. Basically, the mask contains a pattern of transparent and partially opaque horizontal bars superimposed upon a similar pattern of vertical bars. This forms a plurality of transparent areas 11, partially transparent areas 12 and opaque areas 13. The spacing between bars and the width of the bars is not uniform. It may, for example, increase exponentially from left to right across the mask and from bottom to top of the mask. In FIG. 1, the size of the bars is greatly exaggerated for clarity; on an actual mask, there could be as many as 1800 horizontal bars and 1000 vertical bars. The mask might, for example, be formed on film by photographic techniques.

The images, for example, star images in a star field which are to be viewed, are moved at an angle of 45° with respect to the X and Y axes of the mask as indicated by the solid circles 14 and dotted circles 16, FIG. 1. The area encompassed by the periphery of circle 14 represents the star field at one point in its travel across the reticle and the area encompassed by circle 16 represents the star field at a later point in its travel. Thus it is seen that the star field traverses the reticle in a rectilinear fashion at an angle of 45° to the x and y axes. The intensity of the image of any star is then modulated by both the horizontal and vertical bars of the mask, producing an AC signal in the transducer. If motion of the image in the X and Y directions were at uniform velocity, the frequency of the AC signal would vary exponentially because of the variable bar spacing and width. However, the motion of the images likewise is not linear; rather, the field starts to move slowly, and as the motion proceeds, the velocity increases exponentially. With proper relationship of bar spacing and width and the variation of velocity, the AC signal for any star is of constant frequency. Different stars will have a different frequency depending upon their position on the mask. Detailed equations and analysis of the pattern and field motion will be presently given.

The combination of nonuniform band spacing and nonlinear field motion across the mask causes each star image in the field to produce two sine wave components, of different but constant frequencies in the detector signal: one frequency from the X component of the field motion and the other from the Y component. With the proper spacing of the bands or bars, the two frequencies will lie in nonoverlapping frequency bands. For example, the horizontal bars may start with a width which corresponds to the width of the last vertical bar whereby the frequencies are entirely separated.

Figures 2, 3:
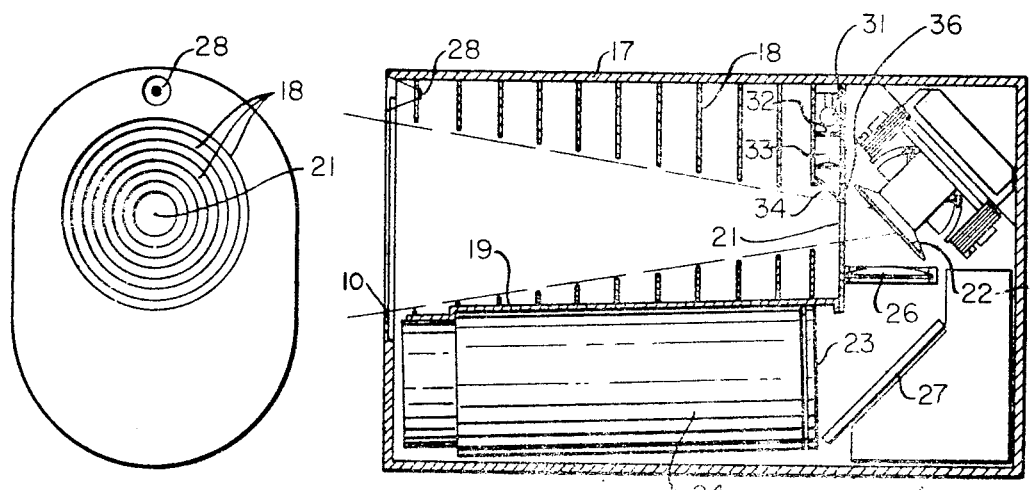
FIG. 2 shows a typical signal generating assembly.
FIG. 3 is an end view of the assembly of FIG. 2.

An apparatus in accordance with the invention is shown in FIGS. 2 and 3. The apparatus includes an outer housing 17 which may be in the form of an aluminum casting. A sun shield is formed by a series of spaced transverse baffles 18 which are disposed within and secured to the upper part of the housing 17. A lower aluminum wall or partition 19 is secured to the lower portion of the baffles. The openings in the baffles 18 define an 18° circular field of view. The edges of the field defined by the baffles are not sharp; however, it is not necessary that the field have sharp edges since stars outside the active 18° field produce frequencies which lie outside the working frequency range of the instrument.

Incoming radiation from the stars within the 18° field passes through aperture 21. The radiation is then reflected by the movable mirror 22, to be presently described in detail. Movement of this mirror causes the field to move across the coding mask 23 which is disposed in front of a photomultiplier tube 24. After leaving the surface of the mirror 22, the radiation is focused by the objective lens 26 onto the coding mask 23. A plane mirror 27 folds the optical path so that the phototransducer can be located below the sun shield.

An electromagnetically actuated sun filter is located at the far end of the sun shield. It drops over the aperture 10 when the sun is detected approaching the field of view. For this purpose, a cadmium sulfide sun detector 28 is located at the front of the instrument and is electrically connected to a mechanism for releasing the filter (not shown).

FIG. 4 shows the electromagneteic assembly for moving the mirror 22. A more complete description of an assembly of this type can be found in copending application Ser. No. 280,540 filed May 15, 1963. The electromagnetic assembly comprises a permanent magnet 41 which forms the base of the assembly and which supplies a steady magnetic flux, indicated by the solid lines 42 in the cylindrical air gap 43. Two field coils 44 and 46 are mounted on the assembly. The field coils are energized with a high frequency AC signal (for example, 5 kc.), and furnish an alternating flux, represented by arrows 51, superimposed on the steady flux in the gap. Drive coils 47 and 48 are mounted on arms 49 and 50 pivoted at 51. If current is passed through the drive coils 47 and 48 in series, a torque is produced which tends to move the coils in the gap. This moves the arms which in turn rotates the mirror 22 mounted on arm 52. At the same time, an AC e.m.f. is induced in each drive coil. This e.m.f. is linearly proportional to the angular position of the drive coils 47 and 48 in the gap 43. The two drive coils are wound so that the current passing through the two coils produces adding torques. This same connection causes the induced high frequency voltages to oppose. This high frequency phase reversing AC e.m.f., which appears at the series drive coil terminals, is a linear indication of the mirror angle. By selecting the wave shape of the drive current, the mirror can be caused to move at any desired variable speed, such that the signals generated responsive to individual images are of constant frequency.

Radiation from all the stars in the field passes through the coding mask and falls on the phototransducer which generates the intelligence signal. This signal is amplified in a signal amplifier which may have automatic gain control so that the output signals will be compatible with the dynamic range of any associated system, for example, a radio link. The magnitude ratios between the stars will be maintained regardless of the amplification as long as the amplifier is linear.

The signal output from the transducer includes two spectral peaks for each star in the field of view. With a coding mask having the spacing previously referred to, one of these peaks is in the band between 1100 and 1850 c.p.s. and indicates the X coordinate of the star location on the coding mask; the other peak is in the band between 1850 and 3000 c.p.s. and indicates the Y coordinate.

Figure 5:
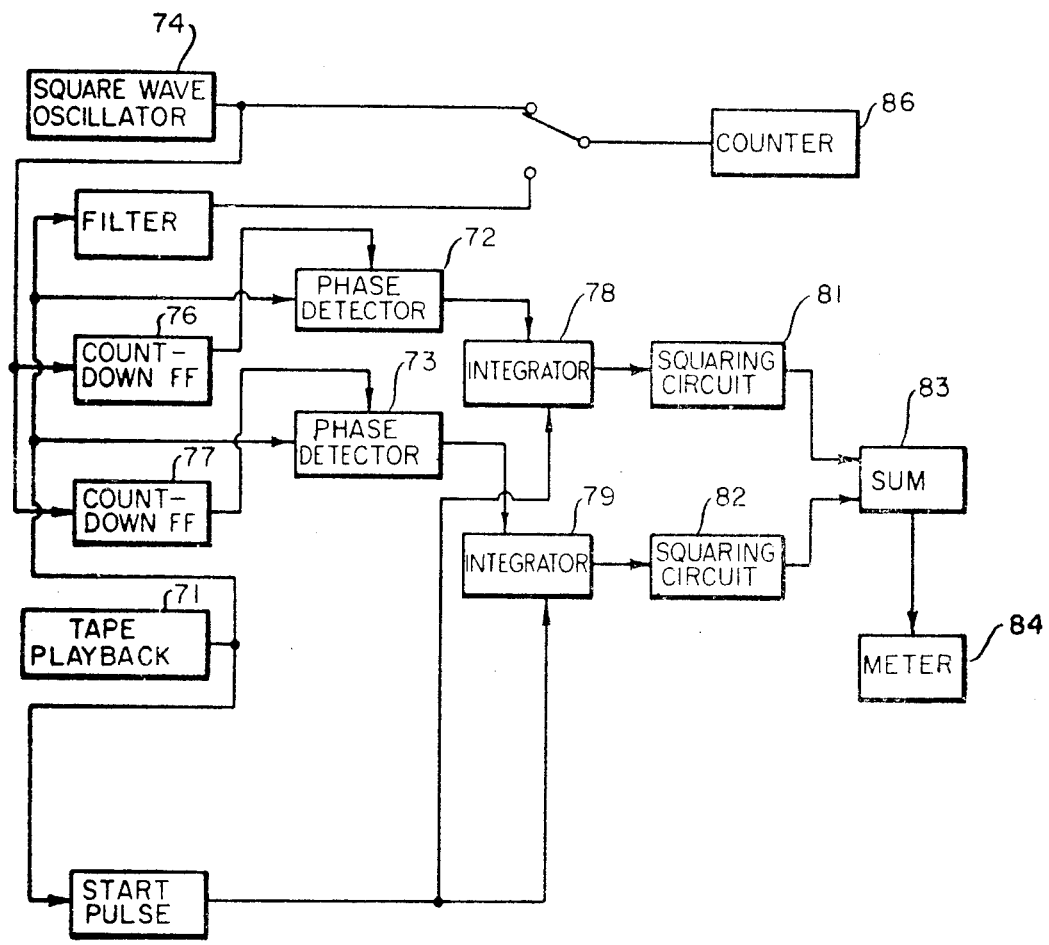
FIG. 5 is a block diagram of a system for reducing the data contained in the generated signal.

The first step in data reduction, therefore, is to actually locate the two highest spectral peaks in the detector output signal of each band. The relative height of these spectral peaks must also be measured for identification of the star field. This spectral analysis can be carried out by a system such as that shown in FIG. 5.

In this system, signal intelligence is first recorded as, for example, on magnetic tape. The magnetic tape is then spliced to form a continuous loop. This magnetic tape is then played back in the apparatus. The signal is applied to phase detectors 72 and 73. A square wave oscillator 74, running at double the measuring frequency, feeds two countdown flip-flops 76 and 77, one of which is positive triggering and the other negative triggering. The flip-flops drive the two phase detectors 72 and 73 in quadrature. The phase detector outputs are then integrated by integrators 78 and 79 and squared by squaring circuits 81 and 82, and applied to a summing circuit 83. The output of the summing circuit is applied to an indicating meter.

The frequency of the phase detectors is slowly scanned from 1100 to 3000 cycles per second by varying the square wave oscillator frequency. When a spectral peak is observed on the meter 84, the oscillator is adjusted for maximum output and the frequency of the oscillator is accurately measured with an electronic counter 86. The height of the peak is recorded by the meter 84.

The characteristic shape of each peak is a sine X/X curve, the first null occurring when the local oscillator differs from the signal by one-half cycle during the measuring time. The measuring time is just the time for single scan. The shape of the sine X/X curve is such that it is possible to detect when the local oscillator is plus or minus one-eighteenth cycle off peak in the measuring time, unless the shape of the peak is distorted by another very nearby peak of similar magnitude. In cases where this occurs, other, more isolated stars can be used for final precision instrument location.

When spectral peaks are found, the remainder of the processing can be carried out either manually or with a digital computer. In either case, the two brightest stars must first be identified and the distance between them calculated from their $x$, $y$ coordinates. The ratio of this signal is also calculated.

An identification table can then be used. This table will be entered with the separation and relative signals between the two brightest stars in the field. The table will provide the celestial conditions (right ascension and declination) for the two brightest stars in the field. When this information is available, the celestial coordinates of the optical axis of the instrument can be immediately calculated from the $x$ and $y$ coordinates of the two brightest stars as well as other identifiable stars.

To understand more fully the type of signals and their generation, the following analysis of the system is presented. The output of the detector as a function of the location of a single star in the field is considered. Since the detector is linear, all stars in the field, acting together, will produce an output equal to the sum of the signals produced by each star separately.

Consider a coding mask such as the one illustrated in FIG. 1, in which the optical transmission as a function of mask coordinates is given by:

$$F(x,y) = \tfrac{1}{2} + \tfrac{1}{4}\,\text{sine}\left[\frac{4\pi\omega}{d}\,e^{-\frac{x}{2\omega}}\right]$$
$$+ \tfrac{1}{4}\,\text{sine}\left[\frac{4\pi\omega}{d}\,e^{-\left(\frac{y}{2\omega}+\frac{1}{2}\right)}\right] \quad (1)$$

where $F(x,y)$ = optical transmission of the coding mask (dimensionless) at coordinates x and y (degrees),
    d = minimum spacing between successive dark bands on the mask (degrees),
    $\omega$ = angular diameter of the star field (degrees).

Notice that in the actual coding mask proposed, the bars have sharp edges rather than sinusoidal shading, as assumed in equation 1. The assumption of sinusoidal shading greatly simplifies the analysis and introduces no significant error, since the higher harmonics introduced by the sharp edges of the bars lie outside the working frequency range of the instrument.

Now let a circular star field of angular diameter w (degrees) be imaged on the mask in the lower left-hand corner so that the edge of the field is tangent to the edge of the mask (see FIG. 1). Let the field move diagonally across the mask at 45° to the coordinate axes slowly at first, then accelerating so that the position of a star, initially located at $x_o$ and $y_o$, is given by:

$$x(t) = x_o - 2\omega \log_e (1-Ct),$$
$$y(t) = y_o - 2\omega \log_e (1-Ct), \quad (2)$$

where:

t = time from start of field motion (seconds),
    C = positive constant to be chosen later (seconds$^{-1}$).

Substituting equations 2 into equation 1, one can see that the resulting modulation of the star image is composed of two constant frequency components:

$$f_x(x_o) = \frac{2\omega C}{d} e - \frac{x_o}{2\omega} (c.p.s.) \quad f_y(y_o) = \frac{2\omega C}{d} e - \frac{y_o}{2\omega} + \frac{1}{2} (c.p.s) \quad (3)$$

Since it is assumed that the star lies inside the field of angular diameter $w$, neither $x_o$ nor $y_o$ can exceed $w$; therefore, the two frequencies are seen always to lie in separate bands. The band containing the x-coordinate information extends from $\frac{2\omega C}{d}$ to $\frac{2\omega C}{d} e^{-1/2}$ and the band containing the y-coordinate information extends from $\frac{2\omega C}{d} e^{-1/2}$ to $\frac{2\omega C}{d} e^{-1}$ Using the simple data reduction technique discussed with respect to FIG. 5, it should be possible to determine the frequencies due to most stars with an accuracy of about ± one-eighteenth cycle per scan. The poorest resolution of the instrument occurs in the y direction when the star is located at the upper edge of the field. This case results in the lowest output frequency. The star image crosses only about 275 bars with the proposed mask, i.e., there are about 275 cycles of the correct frequency during the scan. Determination of the frequency to within ± one-eighteenth cycle per scan represents an uncertainty in the frequency of ± 1 part in 2200. The change in frequency per unit displacement of a star image is given by:

$$\frac{df_x}{dx_o} = \frac{-C}{2\omega} e - \frac{x_o}{2\omega} \text{ (c.p.s./degree)}$$

$$\frac{df_y}{dy_o} = \frac{-C}{2\omega} e - \left(\frac{y_o}{2\omega} + \frac{1}{2}\right) \text{(c.p.s./degree)} \quad (4)$$

Combining equations 3 and 4, the uncertainty in star location, due to an uncertainty in frequency, is given by:

$$dx_o = -2\omega \frac{df_x}{f_x} \text{ (degrees)}$$

$$dy_o = -2\omega \frac{df_y}{f_y} \text{ (degrees)} \quad (5)$$

In the proposed instrument, $w = 18°$, resulting in a worst case uncertainty in star location of ± 0.006° in the y direction.

In the best case, a star at the left-hand side of the field crosses about 700 bars in the x direction. This results in an uncertainty in star location of ± 0.006° in the x direction. In most cases, instrument resolution will be intermediate between these two extremes.

Note that the problem of data reduction can be divided into two parts. First, the star field that the instrument is viewing must be identified, and secondly, precise determination of the location of at least two known stars must be made. In general, it should be possible during the second operation to select stars which will optimize the measurement of location, resulting in an overall instrument resolution of 0.01° or better in both x and y directions.

The minimum possible number of stars that could provide field identification, if only star patterns and relative magnitude are to be used, is two. It is proposed that a field be identified by selecting the two brightest stars in that field and calculating two identification numbers from these two stars. One identification number is the angular distance between the two stars and the other number is the magnitude difference between the two stars. Note that since magnitude is a logarithmic measure of the brightness of the star, the magnitude difference between two stars is really the ratio of the signals produced by the stars in the detector. System gain changes do not affect this quantity.

It can be shown that the probability of a correct identification of an 18-degree star field is about 77 percent, if only the distance between the two brightest stars in the field is used for identification. If the ratio of the signals produced by the two brightest stars can be measured to within 5 percent, the probability of successful identification from magnitude difference alone is 96.5 percent. If both the separation and relative magnitude are used, the probability of successful identification will, therefore, be 99.2 percent. In the other 0.8 percent of the cases, even rough knowledge of the vehicle attitude should resolve the ambiguity.

I claim:

1. An apparatus for generating signals having frequency components corresponding to the position of discrete data comprising a transducer for receiving data images and generating a representative signal, means for projecting an image of each discrete data onto said transducer, a mask disposed to intercept said images, and means providing rectilinear relative movement between said images and said mask, said mask having an optical transmission which repeatedly varies in the direction of said relative movement whereby to modulate the intensity of each image so that a signal component is generated by the transducer corresponding thereto.

2. An apparatus for generating signals having frequency components corresponding to the position of discrete data comprising a transducer for receiving data and generating a representative signal, means for projecting an image of each discrete data onto said transducer, a coded mask disposed to intercept said images, means providing relative movement between said images and said mask, said mask having an optical transmission which repeatedly and nonperiodically varies in the direction of said relative movement, said means for providing relative motion between said mask and said images providing a relative velocity which changes with motion in such a manner that the intensity of the image is periodically varied with a uniform frequency.

3. Apparatus as in claim 2 wherein the periodicity in the direction of motion increases and said velocity decreases to give a constant output frequency for each image.

4. Apparatus as in claim 3 wherein said increase in periodicity and decrease in velocity is exponential.

5. apparatus as in claim 2 wherein said relative movement takes place along two axes and said transmission repeatedly varies along each of said axes to provide a first and second signal for each image corresponding to the position of the image along each of said axes.

6. Apparatus as in claim 2 wherein said mask includes a plurality of vertical bands which are alternately transparent and partially opaque and whose spacing and width increase exponentially, and a plurality of horizontal bands which are alternately transparent and partially opaque and whose spacing and width varies exponentially in the vertical direction to thereby provide a plurality of areas on said mask which are transparent, partially opaque and opaque whereby variation in optical transmission is achieved.

7. Apparatus as in claim 6 wherein the width and spacing of said horizontal lines increase exponentially from the width of the last vertical line.

8. An apparatus for generating signals having frequency components corresponding to the position of stars in a star field comprising a transducer, means for projecting said star field onto said transducer, a mask having different portions with different optical transmissions disposed to intercept the star field, and means providing rectilinear relative movement between the mask and the star field whereby to modulate the intensity of the image of individual stars in said field projected onto the transducer.

9. Apparatus as in claim 8 wherein the optical transmission varies repeatedly in the direction of said relative movement.

10. Apparatus as in claim 9 wherein the optical transmission varies repeatedly and nonperiodically in the direction of said relative movement.

11. Apparatus as in claim 10 wherein the velocity of said relative movement changes to provide an intensity modulation of each star of a constant frequency.

12. An apparatus for generating signals having frequency components corresponding to the position of stars in a star field comprising a transducer, an electromagnetically driven mirror serving to view the star field and project an image of said stars onto said transducer, a mask disposed to intercept the star image projected by said mirror, said mask including a plurality of alternate transparent and partially opaque vertical bands whose width and spacing increase exponentially in one direction and a plurality of alternate transparent and opaque horizontal bands whose width and spacing increase in one direction exponentially and means for energizing said electromagnetic mirror drive means to scan the star images relative to the mask with a velocity which decreases exponentially in said one direction to thereby generate a signal having frequency components of uniform different frequency for each star.